(12) United States Patent
Kanj et al.

(10) Patent No.: US 11,761,850 B2
(45) Date of Patent: Sep. 19, 2023

(54) METHOD FOR CORRECTING A LIGHT PATTERN, AUTOMOTIVE LIGHTING DEVICE AND AUTOMOTIVE LIGHTING ASSEMBLY

(71) Applicant: Valeo Vision, Bobigny (FR)

(72) Inventors: Ali Kanj, Bobigny (FR); Yasser Almehio, Bobigny (FR)

(73) Assignee: Valeo Vision, Bobigny (FR)

( * ) Notice: Subject to any disclaimer, the term of this patent is extended or adjusted under 35 U.S.C. 154(b) by 132 days.

(21) Appl. No.: 17/428,442

(22) PCT Filed: Feb. 24, 2020

(86) PCT No.: PCT/EP2020/054799
§ 371 (c)(1),
(2) Date: Aug. 4, 2021

(87) PCT Pub. No.: WO2020/178061
PCT Pub. Date: Sep. 10, 2020

(65) Prior Publication Data
US 2022/0107241 A1   Apr. 7, 2022

(30) Foreign Application Priority Data

Mar. 1, 2019 (EP) .................................... 19160390

(51) Int. Cl.
*G01M 11/06* (2006.01)
*F21S 41/663* (2018.01)
(Continued)

(52) U.S. Cl.
CPC ........... *G01M 11/06* (2013.01); *F21S 41/153* (2018.01); *F21S 41/663* (2018.01); *H05B 45/10* (2020.01); *H05B 45/325* (2020.01)

(58) Field of Classification Search
CPC .. G01M 11/0264; G01M 11/06; G01M 17/00; H05B 45/00; H05B 45/10;
(Continued)

(56) References Cited

U.S. PATENT DOCUMENTS

2001/0017687 A1   8/2001   Rodriguez, Jr. et al.
2019/0264885 A1   8/2019   Lefaudeux et al.

FOREIGN PATENT DOCUMENTS

DE   10 2016 103 649 A1   9/2017
FR   3 055 980 A1   3/2018

OTHER PUBLICATIONS

International Search Report dated May 14, 2020 in PCT/EP2020/054799 filed on Feb. 24, 2020.

*Primary Examiner* — Monica C King
(74) *Attorney, Agent, or Firm* — Oblon, McClelland, Maier & Neustadt, L.L.P.

(57) ABSTRACT

A method for correcting a first light pattern provided by a lighting device with a matrix of light sources. The method includes steps of providing some resolution data of the light sources, simulating a test map of the light pattern using the resolution data, and simulating distortion maps of the test map. Each distortion map is associated to a distortion factor. Also included is obtaining a real distorted light pattern, comparing the real distorted light pattern with the distortion maps, finding a distortion map which is the most similar to the real distorted map and applying a correction factor to correct the real distorted light pattern, thus obtaining a corrected light pattern. The correction factor is related to the distortion factor of the distortion map which is the most similar to the real distorted map.

20 Claims, 4 Drawing Sheets

(51) Int. Cl.
*F21S 41/153* (2018.01)
*H05B 45/325* (2020.01)
*H05B 45/10* (2020.01)

(58) Field of Classification Search
CPC ...... H05B 45/325; H05B 45/12; H05B 47/11; H05B 47/16; H05B 47/19; B60Q 1/085; B60Q 1/0017; B60Q 1/1423; B60Q 2200/38; F21S 41/153; F21S 41/663

See application file for complete search history.

METHOD FOR CORRECTING A LIGHT PATTERN, AUTOMOTIVE LIGHTING DEVICE AND AUTOMOTIVE LIGHTING ASSEMBLY

TECHNICAL FIELD

This invention is related to the field of automotive lighting devices, and more particularly, to the way light patterns are managed.

STATE OF THE ART

Digital lighting devices are being increasingly adopted by car makers for middle and high market products.

These digital lighting devices usually rely on pixelated technologies. Such digital light sources usually comprise a stripe or a matrix of LEDs and an optical system with different lenses behind, which project the light emitted by the LEDs. These lenses may cause some distortion in the projected beam, which may be perceived by the user. The size and shape of this distortion depend on the lens type (barrel, pincushion . . . ). Further, the perception of this physical issue is relatively proportional to the module resolution, the higher number of LEDs, the greater distortion effect in the projected beam.

This problem has been assumed until now, but a solution therefor is provided.

Document DE 10 2016 103649 A1 discloses an illumination device for controlling light emission by an illumination device in order to generate in the surroundings of the illumination device an output light image formed from light pixels. This is done by an optical elements located in the light beam path from the light emitting device. The magnification between the output light image and the original light image is uneven over the set of light pixels of the original light image affected by the optics. However, this solution is not easily integrated in a variety of automotive light sources.

SUMMARY OF THE INVENTION

The invention provides an alternative solution for improving the aforementioned geometrical problem by a method for correcting a light pattern according to claim 1, an automotive lighting device according to claim 7 and an automotive lighting assembly according to claim 9. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for correcting a light pattern provided by an automotive lighting device with a matrix of light sources, the method comprising the steps of
a) providing some resolution data of the light sources;
b) simulating a test map of the light pattern using the resolution data;
c) simulating distortion maps of the test map, each distortion map being associated to a distortion factor;
d) projecting the test map by the lighting device, thus obtaining a real distorted light pattern;
e) comparing the real distorted light pattern with the distortion maps, finding a target distortion map, which is the distortion map most similar to the real distorted light pattern
f) storing the distortion factor associated to the target distortion map in a control unit; and
g) applying a correction factor to correct the real distorted light pattern, thus obtaining a corrected light pattern, the correction factor being to the inverse of the stored distortion factor of the target distortion map.

This method allows an in-situ or an external calibration of the distortion of an automotive light pattern, wherein the distortion factor of the corrected light pattern is closer to a straight pattern than the original light pattern.

Since the distortion factor is stored, it may be applied as a software correction factor during the normal use of the automotive lighting device.

The correction factor aims to compensate the distortion of the real distorted light pattern. As a consequence, one way of achieving this goal is establishing a distortion scale in two directions: barrel-like and pin-cushion direction. If a barrel-like distortion map is selected as the closest image to the real distorted map, a pin-cushion factor of the same value will be applied to the real light pattern to compensate it.

In some particular embodiments, the step e) is carried out by a goniometer. This device has an accuracy enough to compare the result with the distortion maps.

In some particular embodiments, the resolution data contains the number of light sources, the number of rows and columns in the matrix arrangement and/or power values of each light source.

These values are useful to compare the distortion maps with the real distorted light pattern, since they may provide alterative ways of correcting the distortion.

In some particular embodiments, each light source of the matrix arrangement is fed by a power value and, in the step g), the correction factor is a correction in each one of the power values feeding each one of the light sources of the matrix arrangement.

This is one of the alternative ways of solving the distortion problem: instead applying a global distortion factor (either electronically or by means of a physical lens), the power value of each light source is modified, so that the distortion is corrected by means of varying the light intensity of each light source.

In some particular embodiments, the power values are pulse width modulation values.

Pulse width modulation values are frequently used in controlling light sources, since they provide a way of changing the total power value without altering the maximum current value.

In some particular embodiments, after the step g), the following steps are further performed
obtaining the corrected light pattern;
comparing the corrected light pattern with the distortion maps, finding a target distortion map which is the most similar to the corrected light pattern;
update the stored distortion factor with the distortion factor associated to the target distortion map; and
apply a further correction factor to correct the corrected light pattern, thus obtaining a re-corrected light pattern, the correction factor being related to the distortion factor of the target distortion map.

In the event a single step is not enough to correct the distortion in the original light pattern, the process of re-correcting light patterns may be cycled if necessary.

In a second inventive aspect, the invention provides an automotive lighting device comprising
- a matrix arrangement of solid-state light sources, intended to provide a light pattern;
- a calibrator for performing the steps of the method according to the first inventive aspect.

This lighting device provides the advantageous functionality of auto-calibrating the distortion of the light pattern provided.

In some particular embodiments, the matrix arrangement comprises at least 2000 solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, the light intensity of each pixel may be adapted if necessary to generate a straighter pattern.

In a third inventive aspect, the invention provides an automotive lighting assembly comprising
- an automotive lighting device; and
- an external calibrator for performing the steps of the method according to the first inventive aspect; and
- an external corrector to apply the correction factor to the light pattern.

This assembly may be used in the manufacturing assembly line of a vehicle, to provide a calibrated light pattern just out of the line.

BRIEF LIST OF DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
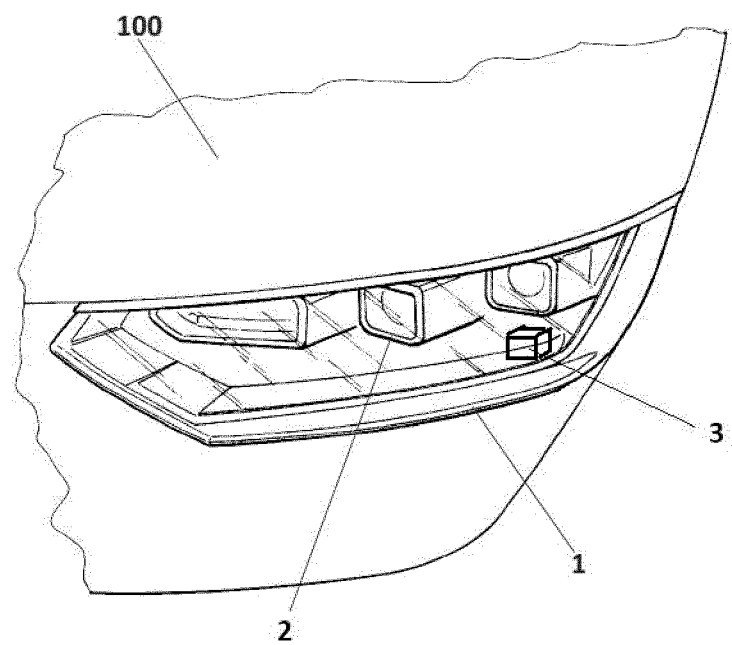
FIG. 1 shows a general perspective view of an automotive lighting device according to the invention.

In these figures, the following reference numbers have been used:
1 Lighting device
2 LED
3 Calibrator
4 Test map
5 Distorsion map
6 Real distorted light pattern
7 Corrected light pattern
10 Resolution data
30 External calibrator
31 External corrector
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 1 is installed in an automotive vehicle 100 and comprises
- a matrix arrangement of LEDs 2, intended to provide a light pattern;
- a calibrator 3 to carry out an in-situ calibration of the geometrical shape of the light pattern provided by the matrix arrangement of LEDs 2.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixilated light beam by the matrix arrangement. The control centre is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

FIGS. 2a to 2d represent steps of a method according to the invention.

Figure 2A:
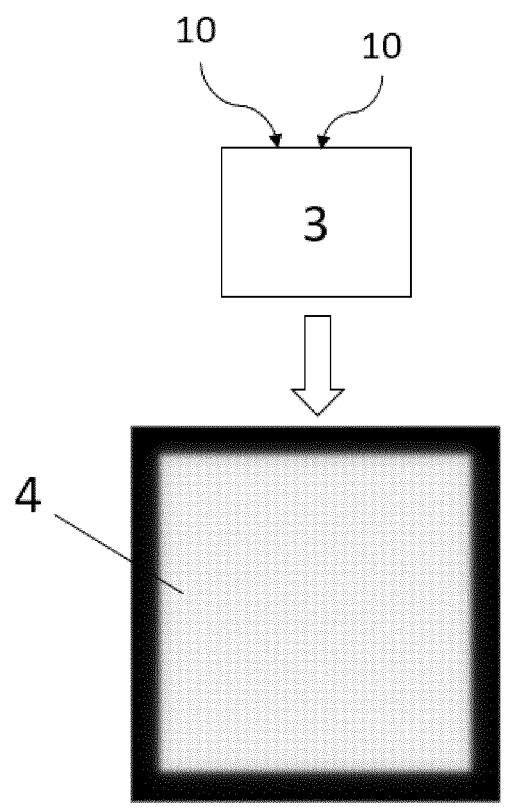
FIGS. 2a to 2d represent steps of a method according to the invention.

FIG. 2a shows a first step. In this step, the calibrator 3 receives some resolution data 10 of the matrix arrangement of LEDs. These data may comprise the number of LEDs, the number of rows and columns in the matrix arrangement and/or power values of each LED. These data are useful to simulate a test map 4 of the light pattern. This test map may be physically projected or not.

Figure 2B:
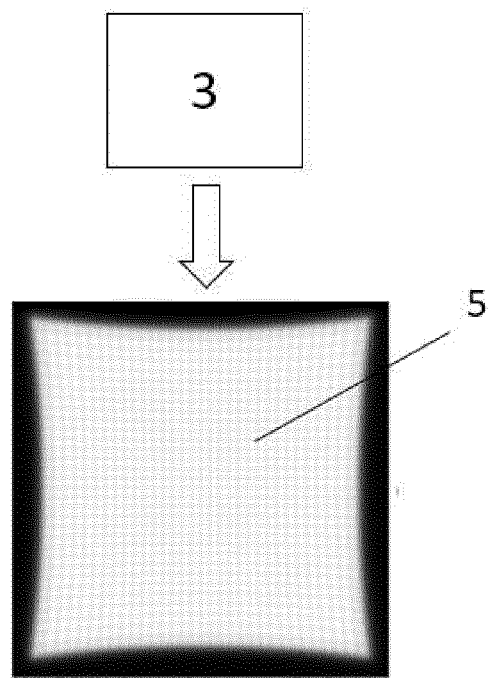

FIG. 2b shows a subsequent step of this method. Once the test map has been generated, several distortion maps 5 are generated out of the test map, each distortion map being associated to a distortion factor. As a consequence, the calibrator 3 has the data of several distorted images of the original map, each distorted image being associated to a distortion factor.

Figure 2C:
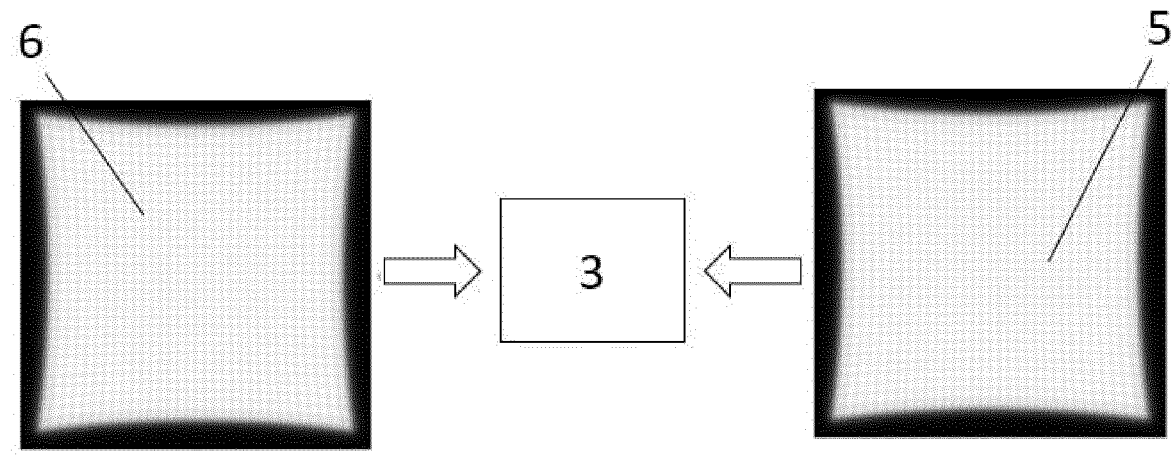

FIG. 2c shows a subsequent step of this method. In this step, the real distorted light pattern 6 is obtained out of the matrix arrangement of LEDs. This real distorted light pattern 6 is compared with the distortion maps 5 generated in the previous step, until the most similar distortion map, called target distortion map, is found. Since every distortion map was associated to a distortion factor, this target distortion map is associated to a target distortion factor. This target distortion factor is stored in a control unit of the automotive lighting device, so that it may be used as the software correction factor until it is updated in a further calibration process.

Figure 2D:
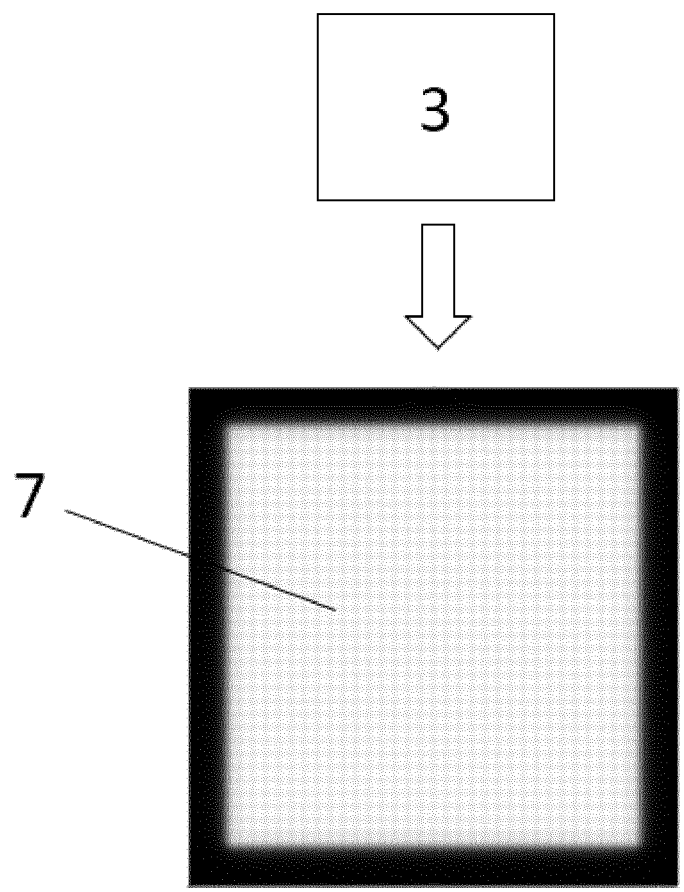

FIG. 2d shows a final step of this method, wherein a correction factor is applied to correct the real distorted light pattern, thus obtaining a corrected light pattern 7. The correction factor is a corrective distortion factor which is calculated as the inverse to the target distortion factor. One way of achieving this goal is establishing a distortion scale in two opposite directions: barrel-like and pin-cushion direction. If a barrel-like distortion map is selected as the closest image to the real distorted map, a pin-cushion factor of the same value will be applied to the real light pattern to compensate it. This correction factor may be applied either electronically or by the interposition of a lens element which results equivalent to this correction factor.

An alternative way of applying a correction factor is by acting on the power values of each LED. Each LED is usually fed by a pulse width modulated signal (PWM), so that by the variation of this PWM value, a variation in the light intensity of the LED is achieved. The light driver in charge of controlling each light source will vary the PWM value so that each pixel is fed with the suitable value defined by the aforementioned calibration method.

In the event the corrected light pattern is not perfectly shaped, the step of choosing a correction factor may be iterated with the checking of a test light pattern using the correction factor calculated in a previous step. This iteration would contain the following sub-steps:
 obtaining the corrected light pattern;
 comparing the corrected light pattern with the distortion maps, finding a distortion map which is the most similar to the corrected light pattern;
 updating the stored distortion factor with the distortion factor associated to the target distortion map; and
 apply a further correction factor to correct the corrected light pattern, thus obtaining a re-corrected light pattern, the correction factor being the inverse of the distortion factor of the distortion map which is the most similar to the corrected light pattern.

Figure 3:
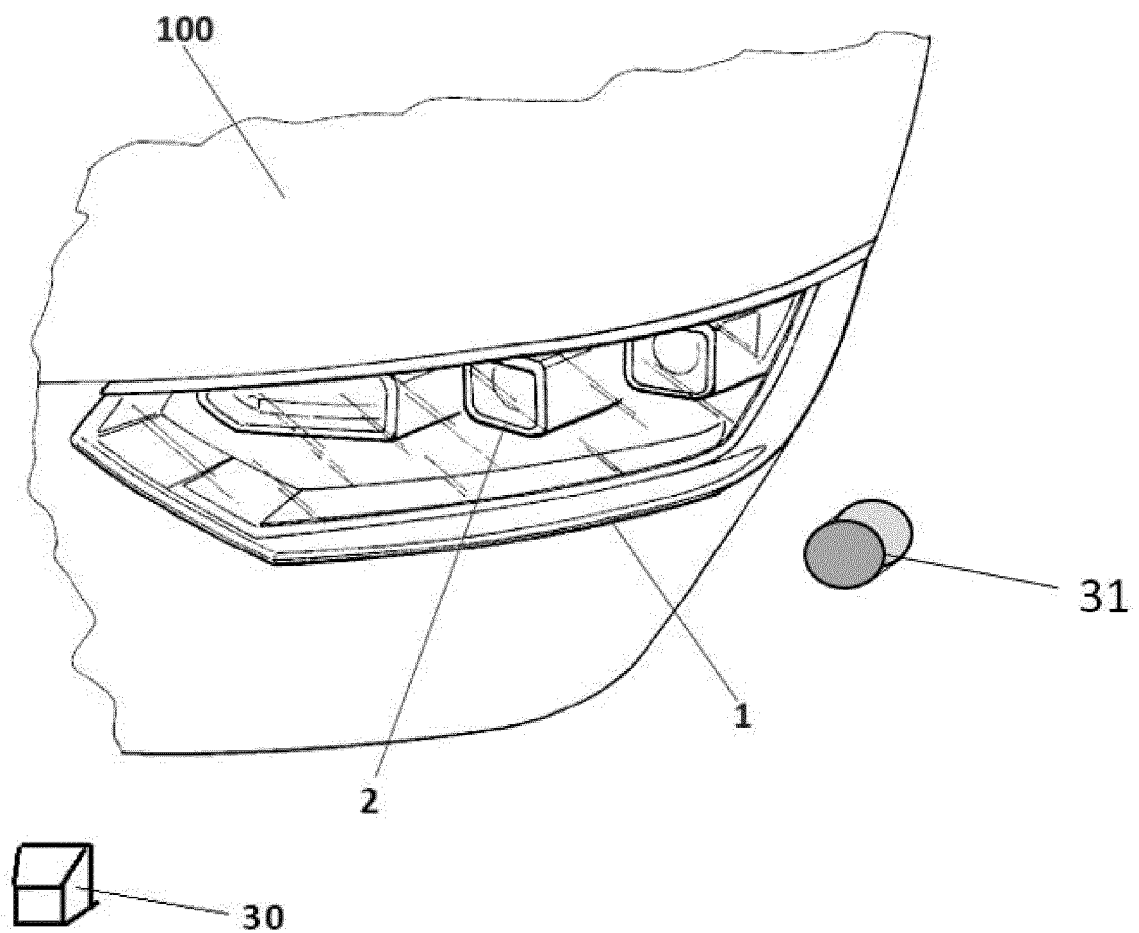
FIG. 3 shows an automotive lighting assembly according to the invention.

FIG. 3 shows an automotive lighting assembly according to the invention. In this case, the automotive lighting device 1 is a standard automotive lighting device and there is an external calibrator 30 which is suitable for performing some of the steps of the method described above and an external corrector 31 to apply the final steps of said method. This makes it possible to use this invention also in standard lighting devices which does not comprise an embedded calibrator.

The invention claimed is:
1. Method for correcting a light pattern provided by an automotive lighting device with a matrix arrangement of light sources, the method comprising the steps of
 a) providing some resolution data of the light sources;
 b) simulating a test map of the light pattern using the resolution data;
 c) simulating distortion maps of the test map, each distortion map being associated to a distortion factor;
 d) projecting the test map by the lighting device, thus obtaining a real distorted light pattern;

e) comparing the real distorted light pattern with the distortion maps, finding a target distortion map, which is the distortion map which is most similar to the real distorted light pattern;
f) storing the distortion factor associated to the target distortion map in a control unit; and
g) applying a correction factor to correct the real distorted light pattern, thus obtaining a corrected light pattern, the correction factor being an inverse of the stored distortion factor of the target distortion map.

2. Method according to claim 1, wherein the step e) is carried out by a goniometer.

3. Method according to claim 1, wherein the resolution data contains a number of light sources, a number of rows and columns in the matrix arrangement and/or power values of each light source.

4. Method according to claim 1, wherein each light source of the matrix arrangement is fed by a power value and, in the step g), the correction factor is a correction in each one of the power values feeding each one of the light sources of the matrix arrangement.

5. Method according to claim 4, wherein the power values are pulse width modulation values.

6. Method according to claim 1, wherein after the step g), the following steps are further performed
obtaining the corrected light pattern;
comparing the corrected light pattern with the distortion maps, finding a target distortion map which is the most similar to the corrected light pattern;
update the stored distortion factor with the distortion factor associated to the target distortion map; and
apply a further correction factor to correct the corrected light pattern, thus obtaining a re-corrected light pattern, the correction factor being an inverse of the distortion factor of the target distortion map.

7. Automotive lighting device comprising
a matrix arrangement of solid-state light sources, intended to provide a light pattern;
a calibrator for performing the steps of the method according to claim 1.

8. Automotive lighting device according to claim 7, wherein the matrix arrangement comprises at least 2000 solid-state light sources.

9. Automotive lighting assembly comprising
an automotive lighting device;
an external calibrator for performing the steps of the method according to claim 1;
an external corrector to apply the correction factor to the light pattern.

10. Method according to claim 2, wherein the resolution data contains a number of light sources, a number of rows and columns in the matrix arrangement and/or power values of each light source.

11. Method according to claim 2, wherein each light source of the matrix arrangement is fed by a power value and, in the step g), the correction factor is a correction in each one of the power values feeding each one of the light sources of the matrix arrangement.

12. Method according to claim 2, wherein after the step g), the following steps are further performed
obtaining the corrected light pattern;
comparing the corrected light pattern with the distortion maps, finding a target distortion map which is the most similar to the corrected light pattern;
update the stored distortion factor with the distortion factor associated to the target distortion map; and
apply a further correction factor to correct the corrected light pattern, thus obtaining a re-corrected light pattern, the correction factor being an inverse of the distortion factor of the target distortion map.

13. Automotive lighting device comprising
a matrix arrangement of solid-state light sources, intended to provide a light pattern;
a calibrator for performing the steps of the method according to claim 2.

14. Automotive lighting assembly comprising
an automotive lighting device;
an external calibrator for performing the steps of the method according to claim 2;
an external corrector to apply the correction factor to the light pattern.

15. Method according to claim 3, wherein each light source of the matrix arrangement is fed by a power value and, in the step g), the correction factor is a correction in each one of the power values feeding each one of the light sources of the matrix arrangement.

16. Method according to claim 3, wherein after the step g), the following steps are further performed
obtaining the corrected light pattern;
comparing the corrected light pattern with the distortion maps, finding a target distortion map which is the most similar to the corrected light pattern;
update the stored distortion factor with the distortion factor associated to the target distortion map; and
apply a further correction factor to correct the corrected light pattern, thus obtaining a re-corrected light pattern, the correction factor being an inverse of the distortion factor of the target distortion map.

17. Automotive lighting device comprising
a matrix arrangement of solid-state light sources, intended to provide a light pattern;
a calibrator for performing the steps of the method according to claim 3.

18. Automotive lighting assembly comprising
an automotive lighting device;
an external calibrator for performing the steps of the method according to claim 3;
an external corrector to apply the correction factor to the light pattern.

19. Method according to claim 4, wherein after the step g), the following steps are further performed
obtaining the corrected light pattern;
comparing the corrected light pattern with the distortion maps, finding a target distortion map which is the most similar to the corrected light pattern;
update the stored distortion factor with the distortion factor associated to the target distortion map; and
apply a further correction factor to correct the corrected light pattern, thus obtaining a re-corrected light pattern, the correction factor being an inverse of the distortion factor of the target distortion map.

20. Automotive lighting device comprising
a matrix arrangement of solid-state light sources, intended to provide a light pattern;
a calibrator for performing the steps of the method according to claim 4.

* * * * *